(12) United States Patent
Santini et al.

(10) Patent No.: US 8,941,494 B2
(45) Date of Patent: Jan. 27, 2015

(54) SAFETY SYSTEM FOR FLAYING MACHINE

(71) Applicants: Stefano Santini, Reggio Emilia (IT);
Giorgio Grasselli, Albinea (IT)

(72) Inventors: Stefano Santini, Reggio Emilia (IT);
Giorgio Grasselli, Albinea (IT)

(73) Assignee: Giorgio Grasselli, Albinea (IT)

( * ) Notice: Subject to any disclaimer, the term of this patent is extended or adjusted under 35 U.S.C. 154(b) by 38 days.

(21) Appl. No.: 13/947,624

(22) Filed: Jul. 22, 2013

(65) Prior Publication Data
US 2014/0043161 A1 Feb. 13, 2014

(30) Foreign Application Priority Data

Aug. 8, 2012 (IT) ............... MI2012A1413

(51) Int. Cl.
*G08B 13/14* (2006.01)
*F16P 3/12* (2006.01)
*A22B 5/16* (2006.01)
*F16P 3/14* (2006.01)

(52) U.S. Cl.
CPC . *F16P 3/12* (2013.01); *A22B 5/166* (2013.01); *F16P 3/147* (2013.01); *F16P 3/148* (2013.01)
USPC .................. 340/568.1; 340/573.1

(58) Field of Classification Search
USPC .................. 340/568.1, 573.1, 650
See application file for complete search history.

(56) References Cited

U.S. PATENT DOCUMENTS

| | | | |
|---|---|---|---|
| 5,198,702 A * | 3/1993 | McCullough et al. | ........ 307/326 |
| 7,049,967 B2 | 5/2006 | Grasselli et al. | |
| 2003/0014779 A1 | 1/2003 | Drotning | |
| 2003/0193400 A1 | 10/2003 | Grasselli et al. | |
| 2011/0084847 A1 | 4/2011 | Grasselli et al. | |

FOREIGN PATENT DOCUMENTS

| | | |
|---|---|---|
| EP | 0445860 A2 | 9/1991 |
| EP | 1353111 A2 | 10/2003 |
| EP | 10178838 | 4/2011 |
| IT | 0001262331 B | 6/1996 |

* cited by examiner

*Primary Examiner* — Shirley Lu
(74) *Attorney, Agent, or Firm* — Pearne & Gordon LLP

(57) ABSTRACT

The invention describes a safety system (100) for a working machine (1), wherein an operator (7) is able to interact with the machine (1), wherein the system (100) comprises a transceiver unit (71) associated with the operator (7), a central processing unit (11), associated with the working machine (1), so as to receive signals from the transceiver unit (71), conductive gloves (81) comprising electrical conduction means (85, 84) configured to operate in ordinary functioning (I) or in an alarm condition (II), electrical connection means (82) configured to connect the transceiver unit (71) to the conductive gloves (81), and wherein the central processing unit (11) is configured to recognize whether the operator (7) is authorized for use of the machine (1), and to transmit an alarm signal (Sx1) so as to disable the machine (1) if the second operative condition (II) occurs.

14 Claims, 3 Drawing Sheets

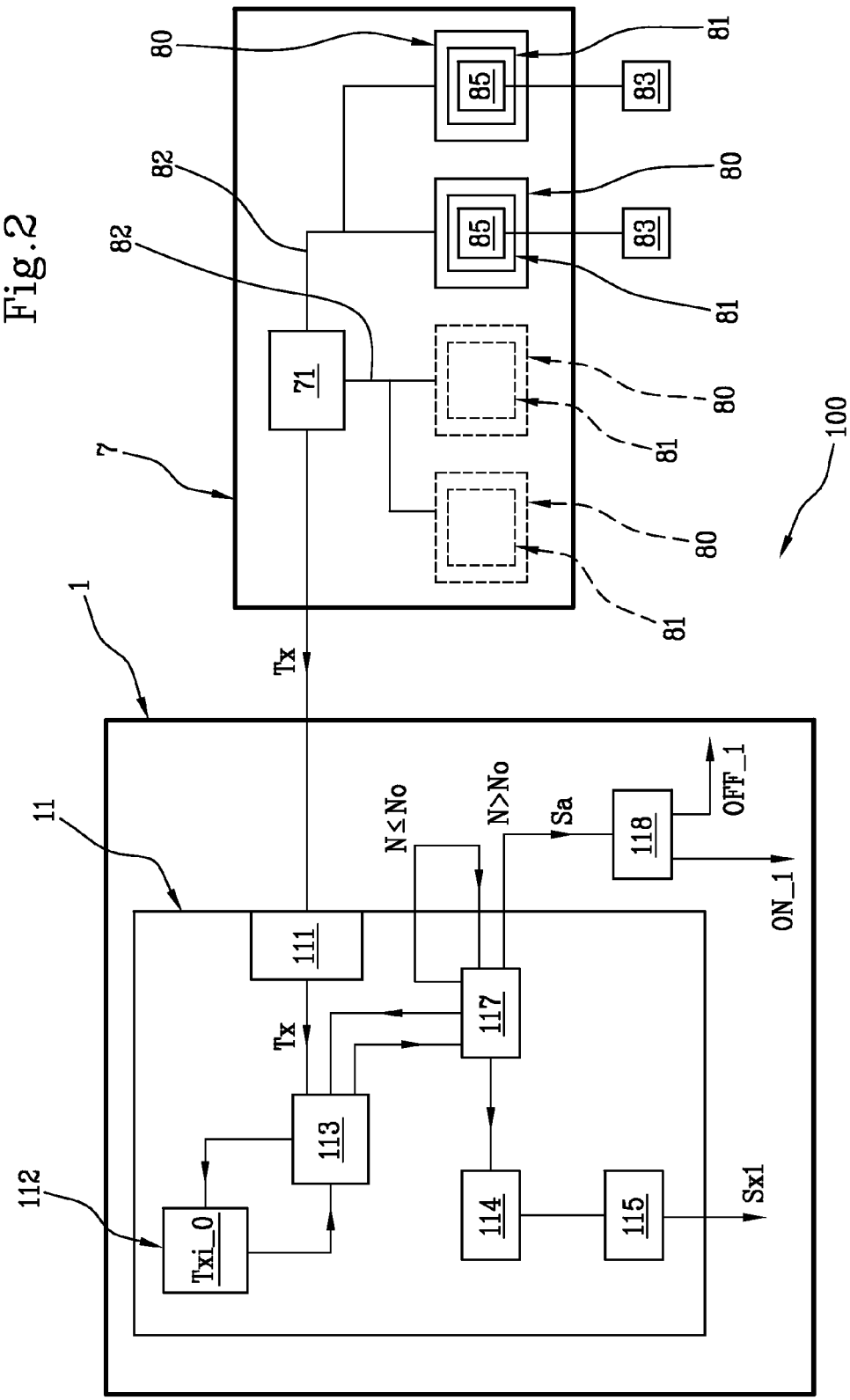

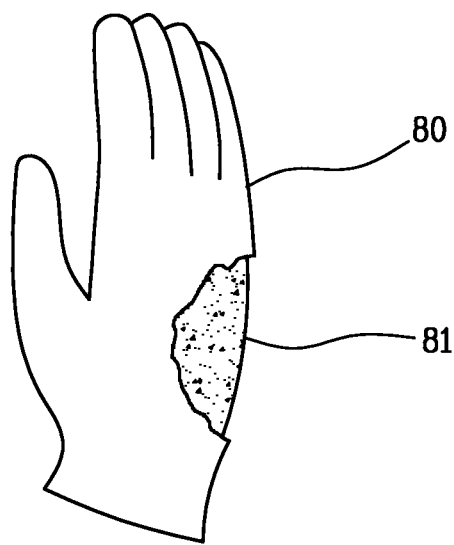
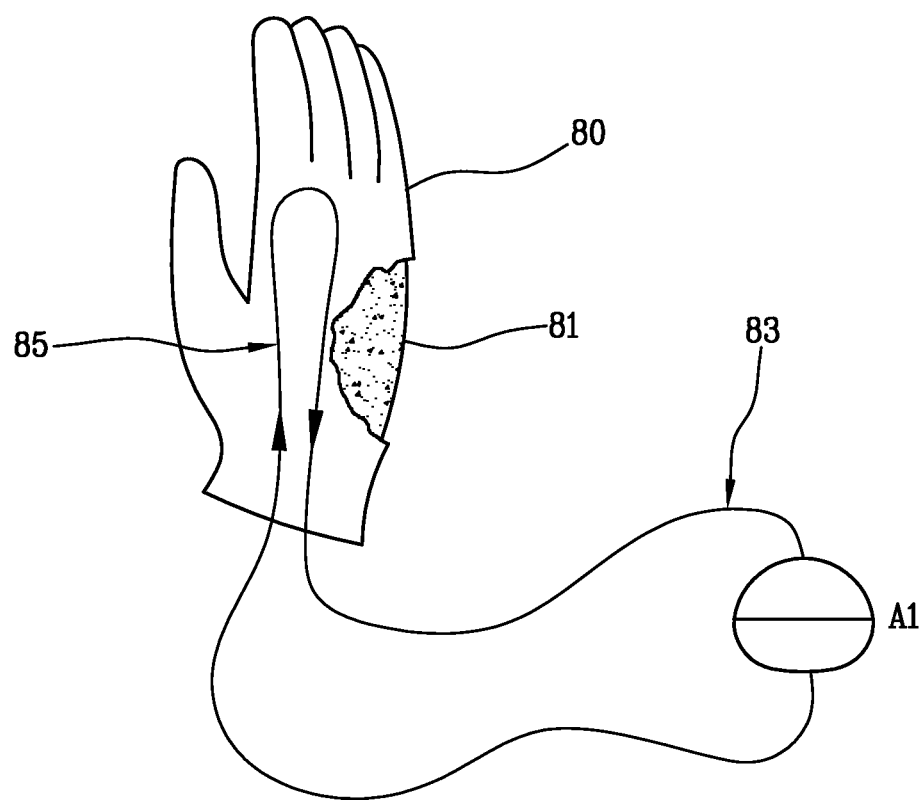
Fig.3a
Fig.3b

SAFETY SYSTEM FOR FLAYING MACHINE

FIELD OF APPLICATION

The present invention refers to a safety system for working machines that is designed to protect the safety of an operator.

More specifically, the system is applied to any type of working machine that has at least one moving member or tool with which the operator could accidentally come into contact and where protection of the upper limbs at the terminal part (hands) thereof is thus necessary.

Even more specifically, the system is applied to a particular working machine called flaying machine, and the following description is provided with reference to this field of application for the sole purpose of simplifying the explanation thereof.

BACKGROUND ART

As is known, a flaying machine (or machine for membrane removal) comprises a frame supporting a flat top on which a piece of meat to be flayed is placed; the flaying machine is equipped with a toothed roller that is set into rotation by a motor and drags the piece of meat, which is manually retained by the operator, so as to submit it to the action of a blade for the purpose of separating the rind from the flesh.

The operator moves the piece of meat close to the roller that automatically drags the product, but his/her hands are working in the vicinity of the roller and the blade.

During operation, the risk of accidental contact of the operator's hands with the blade exists, due to inattention or various unforeseen events that can cause sudden and involuntary movements of the operator's hands resulting in unexpected contact with the blade.

For these reasons, flaying machines can be provided with electronic systems designed to protect the operator's safety.

Yet, a drawback of these systems is that system intervention sometimes takes place even in the absence of real danger, thereby giving rise to the undesirable stopping of the machine resulting in delays in production and reductions in work time.

During operation, there is also the risk of accidental contact with the hands of persons in charge of other tasks, and although they do not specifically work with the flaying machine, they may find themselves having to walk or perform functions in the vicinity of the machine itself.

To mitigate this problem, in Italian patent No. 0001262331 the same Applicant discloses a safety system for a flaying machine using as the critical parameter of detection of an alarm situation, the drop in voltage between the flaying machine and the earth, as compared with a reference signal; the latter, however, cannot be easily estimated as it is affected by the electro-physical characteristics of the operator in charge of the machine and by the environmental conditions, such as moisture and temperature.

An improved solution to the problem is shown in the European patent application no. 10178838 by the same Applicant, wherein the system subjects the working machine to electric oscillation by means of a circuit-related solution. The frequency is equal to that of the resonant circuit; each "touch" of the operator affecting this circuit causes a disturbance to the resonant circuit. Should this disturbance prove to be excessive, the continuously monitored safety system disables the machine.

This system requires a specific pre-operative calibration sequence for identification of the human parameters of the operator so that the machine will react in the case of an alarm based on personalized settings regarding the user, so as to guarantee the safety of the same user.

This system requires the utilization of a computer display for management of the calibration procedures and supplementary electronic marking so as to enable univocal identification of the operator who is qualified for use of the machine.

Furthermore, operation of the system is still not completely immune to environmental conditions in the presence of particular levels of moisture and particular temperature ranges.

These issues are essentially due to wear of the gloves both the conductive and the insulating glove of the operator.

Moreover, poor care of the gloves, both the conductive and the insulating glove, on the part of operators is frequent and it is not rare to see operators working with gloves that are unsuitable electrically, although they may be intact on the outside.

The operator often tends not to replace obsolete gloves with sufficient frequency.

That which has been described makes improvement of the safety of the operators even more important.

The published patent application EP0445860 filed by the same Applicant discloses a control and safety system for electrically operated devices with a cutting tool connected to an electric motor, and control means for halting and reversing the movement of the motor.

The system comprises a pair of electrically conducting gloves to be worn by the operator and connected by a conducting wire to a control box fixed to the operator's body and containing a rechargeable battery and an electronic sensor-transmitter circuit designed to emit a light pulse when both gloves are being worn by the operator and to interrupt the light pulse when one of the two gloves or part of the operator's body accidentally makes contact with any metal part of the device; an optical fibre is suitable for connecting the control box to the base of the device, in which a receiving control circuit is located.

The solution provided necessarily requires a physical connection optical fibre between the control box worn by the operator and the device (the machine to be controlled).

A solution such as this hinders the operator, who remains physically bound to the machine and is not totally free to move.

Furthermore, the technology utilized is useless and complex to realize.

The aim of the present invention is to provide a safety system for working machines that is improved in terms of safety for an operator.

Another aim is to provide a safety system that is simple to implement and realize.

A further aim is to provide a safety system that is operatively easy to use.

An additional aim is to provide a safety system that is capable of ensuring quick identification of the operators.

SUMMARY OF THE INVENTION

These and other aims are achieved by a safety system for working machines, as described in the appended claims.

As described herein, the safety system achieves the following technical effects:
  It is unaffected by moisture and temperature;
  It is reliable also as concerns the presence of more than one operator;
  It is simple in construction and realization;
  It employs the use of reliable, disposable gloves, eliminating the effect of obsolescence.

The cited technical effects and other technical effects of the invention will emerge in more detailed form from the description herein below of an example embodiment provided by way of an approximate, non-limiting example with reference to the accompanying drawings.

BRIEF DESCRIPTION OF THE DRAWINGS

FIG. 2 shows a block diagram of the system of the invention.

FIG. 3a shows a first embodiment of a component of the system of the invention.

FIG. 3b shows a second embodiment of a component of the system of the invention.

DETAILED DESCRIPTION

Figure 1:
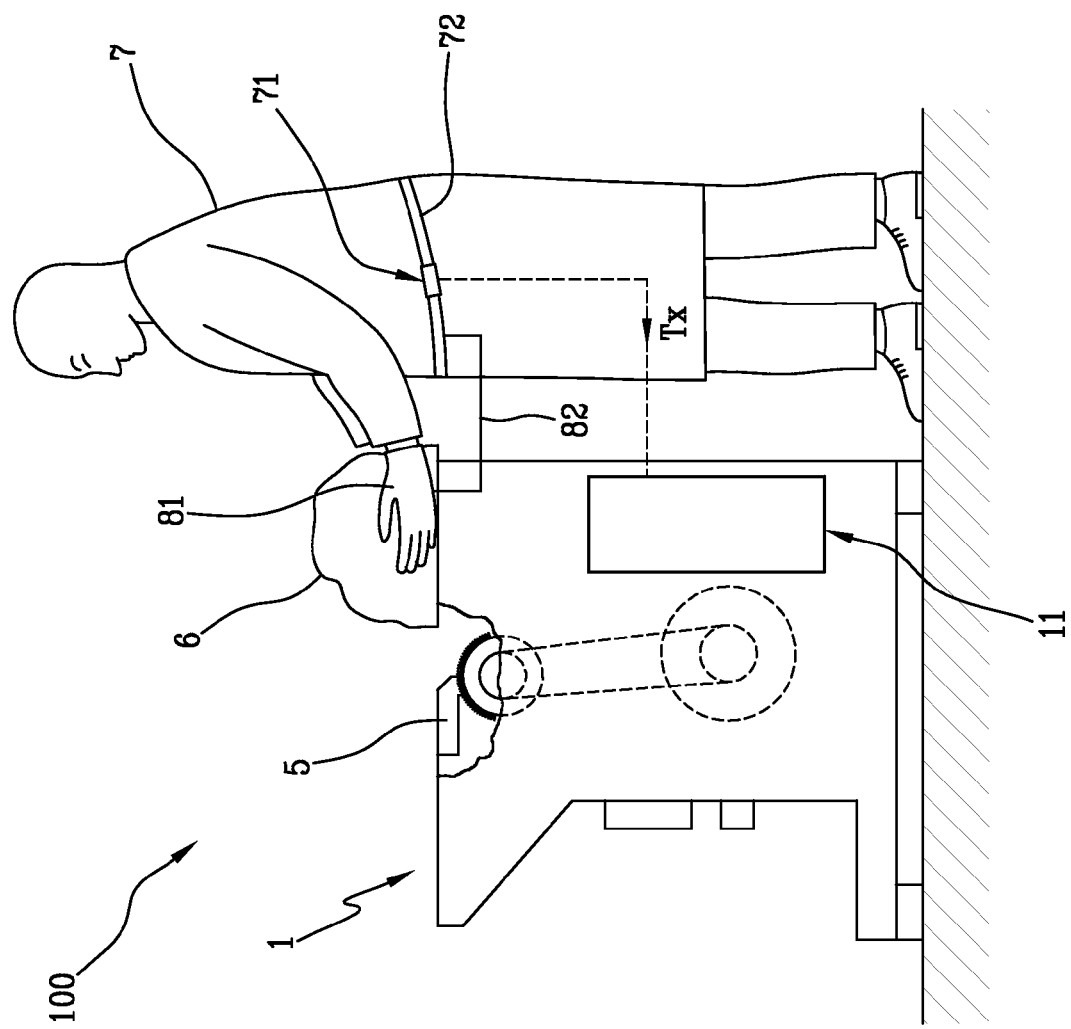
FIG. 1 shows a sketch of the system of the invention and the principal components thereof.

The invention describes a safety system for a working machine, wherein an operator is able to interact with the machine, wherein the system comprises a transceiver unit associated with the operator, a central transceiver unit associated with the working machine, so as to receive signals from the transceiver unit, conductive gloves comprising electrical conduction means configured to operate in ordinary functioning or in an alarm condition, electrical connection means configured to connect the transceiver unit to the conductive gloves, and wherein the central transceiver unit is configured to recognize whether the operator is authorized for use of the machine, and to transmit an alarm signal so as to disable the machine if the second operative condition occurs.

With particular reference to FIGS. 1 and 2, a working machine 1, specifically a flaying machine, is shown.

The invention comprises a safety system 100 for this working machine 1.

An operator 7 is able to interact with the machine 1 for the flaying procedures on the blocks of meat 6.

The operator 7 is equipped with a transceiver unit 71.

According to the invention, the transceiver unit 71 is configured to transmit a presence signal Tx representing the presence of the operator 7.

In other words, the safety system 100 of the invention comprises a transceiver unit 71 associated with the operator 7 and configured to transmit a presence signal Tx representing the presence of the operator 7 in proximity to the machine 1.

More specifically, the transceiver unit 71 is configured to emit the presence signal Tx having the characteristics of a continuous signal.

Preferably, the transceiver unit 71 is worn by the operator 7, more preferably it is associated with a belt 72 worn by said operator.

Advantageously, according to the invention, the transceiver unit 71 comprises an RFID transponder.

Advantageously, according to the invention, the RFID transponder is an active RFID transponder.

Alternatively, or in addition, the transceiver unit is configured to operate using radio frequency (RF).

As a further alternative or in addition, the transceiver unit is configured to operate using infrared light (IR).

Advantageously, according to the invention, the presence signal TX comprises a univocal identifier of the operator 7.

The system 100 according to the invention further comprises a central processing unit 11, associated with the working machine 1 and configured to receive the presence signal Tx.

The central processing unit 11 is preferably comprised in the flaying machine 1.

In general, it should be noted that in the present context and in the following claims, the central processing unit 11 shall be presented as subdivided into distinct functional modules (memory modules or operative modules) with the sole aim of describing the functions of this unit clearly and completely.

This unit may actually be made up of a single electronic device, suitably programmed to perform the described functions, and the various modules may correspond to hardware units and/or routine software that are part of the programmed device.

Alternatively, or in addition, these functions can be performed by a plurality of electronic devices in which the above-mentioned functional modules can be distributed.

The control units may also make use of one or more processors for execution of the instructions contained in the memory modules.

Furthermore, the above-mentioned functional modules may be distributed in different computers, locally or remotely, based on the architecture of the network in which they reside.

With reference to FIGS. 3a and 3b, the system 100 according to the invention further comprises conductive gloves 81, designed to be worn by the operator 7 in conditions of interaction with the machine 1.

In other words, when the operator needs to perform a flaying procedure, he/she wears the conductive gloves 81 so as to work safely, as explained below.

Preferably, the operator 7 also wears an insulating glove 80, over the conductive glove 81 (FIG. 3a).

In a first embodiment, the conductive gloves 81 are configured to make contact with a signal present on the structure of the machine 1, in the event of an insulating glove 80 being cut by the blade 5.

In other words, the system of the invention comprises a forced application of a frequency signal Sf1 of a first electrical conductor circuit 84 connected to the ends of an earth inductor of the machine 1.

The frequency signal Sf1 is therefore available over the entire mechanical structure of the machine.

Therefore, the frequency signal Sf1 is also available on the conductive glove 81 in the event of contact between the conductive glove 81 and the blade 5.

The first electrical conductor circuit 84 is therefore an electrical conduction means.

In a second embodiment, according to the invention, the conductive glove 81 comprises a second electrical conductor circuit 85 (FIG. 3b).

In other words, the second electrical conductor circuit 85 is deposited on the fabric glove, particularly on the conductive glove 81.

The second electrical conductor circuit 85 generates a continuous circuit over the entire glove.

In this embodiment, the second electrical conductor circuit 85 is connected to an isolated electrical circuit 83.

Preferably, the isolated electrical circuit 83 comprises a current generator A1 (FIG. 3b) configured to supply direct current to the second electrical conductor circuit 85.

Preferably, a current of approximately 100 uA generated by the current generator A1 passes through the conductive gloves 81, in this case, so as to make it possible to carry out continuous integrity measurement of electrical continuity.

This makes it possible to check continuously to ensure that the circuit is not open, that is, that the glove has not been cut by the blade.

In a variant form, the second electrical conductor circuit 85 may be on the insulating glove 80.

Advantageously, according to the invention, the electrical conduction means, be it the first electrical conductor circuit 84 or the second electrical conductor circuit 85, is configured to operate in a first operative condition I representing an ordinary functioning of the machine 1; in this condition, the operator 7 is electrically isolated from the machine 1.

Alternatively, and advantageously, according to the invention, the electrical conduction means 85, 84 are configured to operate in a second operative condition II representing an alarm state of the machine 1; in this condition, the operator 7 is in a condition of electrical conduction with the machine 1.

The system 100 comprises electrical connection means 82 configured to connect the transceiver unit 71 to the conductive gloves 81.

The system of the invention allows for the generation of alarm signals in the event that hazardous conditions are detected.

The central processing unit 11 according to the invention comprises a reception module 111 configured to receive the presence signal Tx.

In other words, when the operator 7 approaches the machine 1, the transceiver unit 71 sends the presence signal Tx to the central processing unit 11, so that the operator can be recognized as authorized to operate the machine 1.

In fact, the central processing unit 11 according to the invention comprises a memory module 112 configured to contain a predefined structure of presence signals $Txi\_0$ representing an operator 7 authorized to operate the machine 1.

In other words, the memory module 112 comprises the structure of data that the signal Txi must contain so as to have the operators 7 be identified as authorized to work with the machine 1.

The central processing unit 11 according to the invention comprises a recognition module 113 configured to compare the current presence signal Tx with the predefined structure of presence signals $Txi\_0$ comprised in the memory module 112.

In other words, the presence signal Tx of the user 7 is compared with the predefined structure of signal $Txi\_0$ of the operators 7 authorized for use of the machine 1.

The central processing unit 11 further comprises an authorization module 114 configured to enable use of the machine 1 by the operator 7 if the current presence signal Tx is compatible with the predefined structure of signal $Txi\_0$ comprised in the memory module 112.

The authorization module 114 is further configured to deny use of the machine 1 by the operator 7 if the current presence signal Tx is incompatible with the predefined structure of signal $Txi\_0$ comprised in the memory module 112.

The central processing unit 11 further comprises an operative module 117 configured to determine the cause of any incompatibility between the current presence signal Tx and the predefined signal structure $Txi\_0$ comprised in the memory module 112.

According to the invention, the operative module 117 is associated with the recognition module 113 and with the authorization module 114.

For this purpose, the operative module 117 is configured to:
  count the number N of consecutive incompatibilities detected;
  wait for the arrival of the next signal Tx, if that number N is less than or equal to a predefined number $N_0$;
  generate an alarm signal Sa, if that number N is greater than the predefined number $N_0$.

The central processing unit 11 further comprises a shutdown module 118, activated by the alarm signal Sa and configured to:
  disable operation of the machine 1 as long as incompatibilities are detected.

Disabling takes place by means of the generation of a corresponding signal $OFF\_1$.
  enable operation of the machine 1 when subsequent presence signals Tx are compatible.

Enabling takes place by means of the generation of a corresponding signal $ON\_1$.

In other words, in the presence of errors in the transmission of the signal Tx, there are two possibilities:
  The error is random and thus of no importance because the data will be correct upon the next reception of the signal Tx;
  If the unit 117 receives continuous errors, there may be two operators 7 present in the reception area of the unit 11, both with transceiver units 71 generating transmission signals Tx compatible with the predefined signal structure $Txi\_0$.

In this case, the two transceiver units 71 both attempt to transmit their signal Tx at the same time, which inevitably causes interference, thereby generating continuous errors in reception.

It is essential that the system comprises this situation because in the event of an emergency, the device 71 that stops transmission in order to signal an emergency would be blocked by the remaining unit 71 that is not in an emergency state.

In this situation, the shutdown module 118 disables operation of the machine 1 until the anomaly clears, that is, until the eventual second operator 7 leaves the area where transmitting and receiving to/from the machine 1 is possible.

Advantageously, the central processing unit 11 according to the invention further comprises a first alarm module 115 configured to emit an alarm signal Sx1 so as to disable the machine 1 if the second operative condition II occurs for the operator 7 authorized by the authorization module 114.

In other words, the alarm module 115 is enabled when the operator 7 is in a condition of electrical conduction with the machine 1.

In other words, the signal detected on the conductive gloves 81 is brought to the unit 71 of the operator 7.

The transceiver unit 71 comprises a first control module 711 configured to detect the presence, on the conductive gloves 81, of the frequency signal Sf1.

As stated previously, the detection of this signal represents a contact between the blade and the operator's glove.

Advantageously, according to the invention the first control module 711 is configured to block the transmission of the presence signal Tx in the event of detection of the presence of the frequency signal Sf1.

In this manner, the processing unit 11 does not enable operation of the machine 1.

The technical effect ensured thereby is the impossibility of the machine to operate under conditions that are dangerous for the operator.

The transceiver unit 71 comprises a second control module 712 configured to detect a lack of continuity in the electrical conductor circuit 85.

As stated previously, the detection of a lack of continuity such as this represents a contact between the blade and the operator's glove, which thereby brings about an alarm situation.

The second control module 712 is further configured to block the transmission of the presence signal Tx in the event of detection of a lack of continuity.

In this manner, the processing unit 11 does not enable operation of the machine 1.

In other words, the system detects the presence of the frequency signal Sf1 or the loss of continuity of the second electrical conductor circuit 85 and decides to block the carrier of the transmitter, particularly the RFID, addressed to the receiver 111 so that the processing unit 11 will emit a shutdown signal, suitably de-energizing and energizing in sequence several safety relays of the machine 1.

As explained hereinabove, the emergency detection solution uses two different and distinct approaches.

In a first embodiment, the first system is based on the forced application of a frequency signal to the ends of an earth inductor and thus available over the entire mechanical structure of the machine.

The operator wears the internal conductive glove 81 and the external insulating glove 80. The conductive gloves 81 are electrically connected to the operator 7.

In the undesirable event that the operator is physically injured, the cutting of the external insulating glove leads to contact of the conductive glove with the blade and as a result, with the frequency signal present on the machine.

Detection of this signal by the central processing unit 11 triggers the generation of the emergency signal for shutting down the machine.

In a second embodiment, the system is based on detection of the interruption of an electrical conductor circuit 85 deposited on a conductive or non-conductive glove.

The operator wears the internal conductive glove 81 with the guard circuit (electrical conductor circuit 85) and externally the insulating protective glove for use with food.

In the event of the occurrence of the condition of a hazard/cutting of the gloves, by means of the blade, the previously mentioned guard circuit is interrupted.

This interruption triggers the generation of the emergency shutdown signal by the central processing unit 11.

Both solutions for identifying a condition for shutting down the machine can coexist or be activated alternatively.

The advantage achieved by the invention lies in that it enables a fast and an accurate identification of a situation that is hazardous for an operator, with an immediate response of the system which disables operation of the machine.

The system ensures recognition of situations in which there are present a number of operators potentially authorized to operate the machine, situations in which there has been contact between the blade and the operator's gloves, and situations in which there are unauthorized operators attempting to utilize the machine.

In all of these situations, the system ensures a response with maximum safety for the operator and thus better management of the work cycle.

The invention claimed is:

1. A safety system (100) for a working machine (1) whereby an operator (7) is able to interact with said machine (1), and wherein the system (100) comprises:
    a transceiver unit (71) associated with said operator (7) and configured to transmit a presence signal (Tx) representing the presence of said operator (7) in proximity to said machine (1);
    a central processing unit (11), associated with said working machine (1), configured to receive said presence signal (Tx);
    at least one conductive glove (81), designed to be worn by said operator (7) in conditions of interaction of said operator (7) with said machine (1), comprising electrical conduction means (85, 84) configured to operate in:
        a first operative condition (I) representing an ordinary functioning of said machine (1), wherein said operator (7) is electrically isolated from said machine (1);
        a second operative condition (II) representing an alarm state of said machine (1), wherein said operator (7) is in a condition of electrical conduction with said machine (1);
    electrical connection means (82) configured to connect said transceiver unit (71) to said at least one conductive glove (81);
characterized in that said transceiver unit (71) is configured to operate using radio frequency and
wherein said central processing unit (11) comprises:
    a reception module (111) configured to receive said presence signal (Tx);
    a memory module (112) configured to contain a predefined structure of presence signals (Txi_0) representing different operators (7) authorized to operate said machine (1);
    a recognition module (113) configured to compare the current presence signal (Tx) with said predefined structure of presence signals (Txi_0) comprised in said memory module (112);
    an authorization module (114) configured to enable use of the machine (1) by said operator (7) if the current presence signal (Tx) is compatible with the predefined structure of signals Txi_0 comprised in said memory module (112);
    a first alarm module (115) configured to transmit an alarm signal (Sx1) to said safety system (100) so as to disable said machine (1) if said second operative condition (II) occurs for said operator (7) authorized by said authorization module.

2. The safety system (100) according to claim 1, wherein said electrical conduction means (84) comprises a first electrical conductor circuit (84) available over the entire structure of said machine (1) and having a frequency signal (Sf1) passing through it.

3. The safety system (100) according to claim 2, wherein said transceiver unit (71) comprises a first control module (711) configured to detect the presence, on said conductive gloves (81), of said frequency signal (Sf1) representing a contact between a blade (5) and at least one of said conductive gloves (81).

4. The safety system (100) according to claim 3, wherein said first control module (711) is further configured to block the transmission of said presence signal (Tx) in the event of detection of the presence of said frequency signal (Sf1), so that said processing unit (11) will not enable the operation of said machine (1).

5. The safety system (100) according to claim 1, wherein said electrical conduction means (85) comprises a second electrical conductor circuit (85) connected to an isolated electrical circuit (83).

6. The safety system (100) according to claim 5, wherein said transceiver unit (71) comprises a second control module (712) configured to detect a lack of continuity in said second electrical conductor circuit (85) representing a contact between said blade (5) and at least one glove of said operator (7).

7. The safety system (100) according to claim 6, wherein said second control module (712) is further configured to block the transmission of said presence signal (Tx) in the event of detection of said lack of continuity, so that said processing unit (11) will not enable operation of said machine (1).

8. The safety system (100) according to claim 1, wherein said central processing unit (11) further comprises an operative module (117) configured to determine the cause of any incompatibility between said current presence signal (Tx) and said predefined signal structure (Txi_0) comprised in said memory module (112).

9. The safety system (100) according to claim 8, wherein said operative module (117) is configured to:
   count the number (N) of consecutive incompatibilities detected;
   wait for the arrival of the next signal (Tx), if that number (N) is less than or equal to a predefined number ($N_0$);
   generate an alarm signal (Sa), if that number (N) is greater than said predefined number ($N_0$).

10. The safety system (100) according to claim 9, wherein said central processing unit (11) further comprises a shutdown module (118), activated by said alarm signal (Sa) and configured to:
   disable operation of said machine (1) as long as incompatibilities are detected;
   enable operation of said machine (1) when subsequent presence signals (Tx) are compatible.

11. The safety system (100) according to claim 1, wherein said presence signal (TX) comprises a univocal identifier of said operator (7).

12. The safety system (100) according to claim 1, wherein said transceiver unit (71) is worn by said operator (7).

13. The safety system (100) according to claim 1, wherein said presence signal (Tx) is continuous.

14. The safety system (100) according to claim 1, wherein said transceiver unit (71) comprises an RFID transponder.

* * * * *